United States Patent
Matsuoka

(10) Patent No.: US 7,467,463 B2
(45) Date of Patent: Dec. 23, 2008

(54) METHOD OF PROCESSING END PORTIONS OF SHIELDED WIRE

(75) Inventor: Masaki Matsuoka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 94 days.

(21) Appl. No.: 11/656,946

(22) Filed: Jan. 24, 2007

(65) Prior Publication Data
US 2007/0173122 A1   Jul. 26, 2007

(30) Foreign Application Priority Data
Jan. 26, 2006   (JP) .......................... P.2006-017908

(51) Int. Cl.
*H01B 13/20* (2006.01)
(52) U.S. Cl. .............. 29/828; 29/857; 29/861; 29/863; 72/416
(58) Field of Classification Search .............. 29/828, 29/857, 861, 863; 72/416
See application file for complete search history.

(56) References Cited

U.S. PATENT DOCUMENTS 3,553,835 A * 1/1971 Demler, Sr. et al. ........... 29/871
4,053,200 A * 10/1977 Pugner ....................... 439/578
6,243,947 B1 * 6/2001 Fujita et al. ................... 29/867
6,776,196 B2 * 8/2004 Yamakawa ................. 140/71 R
2005/0076500 A1 * 4/2005 Matsumura ................... 29/828

FOREIGN PATENT DOCUMENTS

JP   2000-102133   4/2000

* cited by examiner

*Primary Examiner*—C. J Arbes
(74) *Attorney, Agent, or Firm*—Kratz, Quintos & Hanson, LLP

(57) ABSTRACT

An end portion processing apparatus for processing an end portion of a shielded wire in which part of an outer sheath has been removed such that an exposed braid disposed between an inner sheath and the outer sheath extends from a distal end of the outer sheath, includes a wire clamp portion which positions the end portion of the shielded wire in an open condition of the wire clamp portion, and clamps the end portion of the shielded wire, a pair of claw portions which strikes against the exposed braid radially thereof at the clamped end portion of the shielded wire to expand the end portion of the braid, a first pipe portion which is disposed in a standby position on a line of extension of the clamped end portion of the shielded wire, and is fitted onto an outer periphery of the inner sheath, a second pipe portion which is provided on an outer periphery of the first pipe portion in concentric relation thereto, and is slid toward the shielded wire to fold back the expanded braid on the outer sheath, and a control portion which controls the operations of the claw portions, the first pipe portion and the second pipe portion.

4 Claims, 5 Drawing Sheets

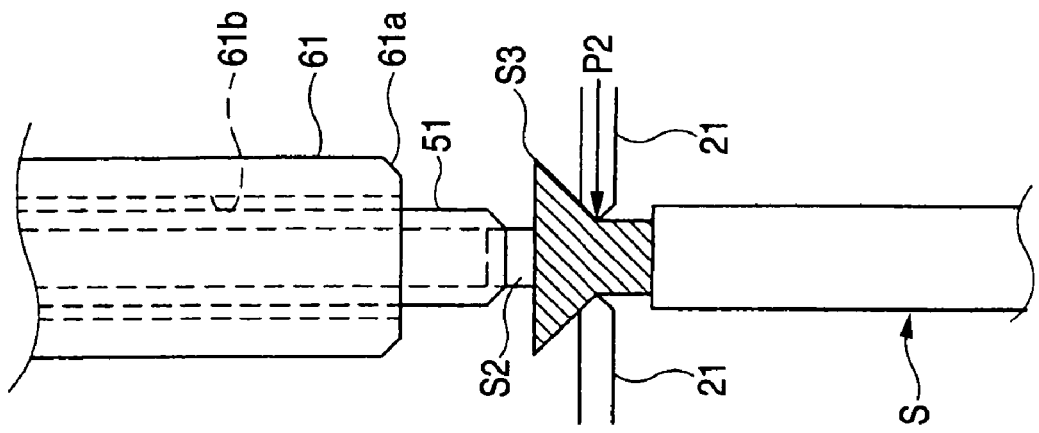
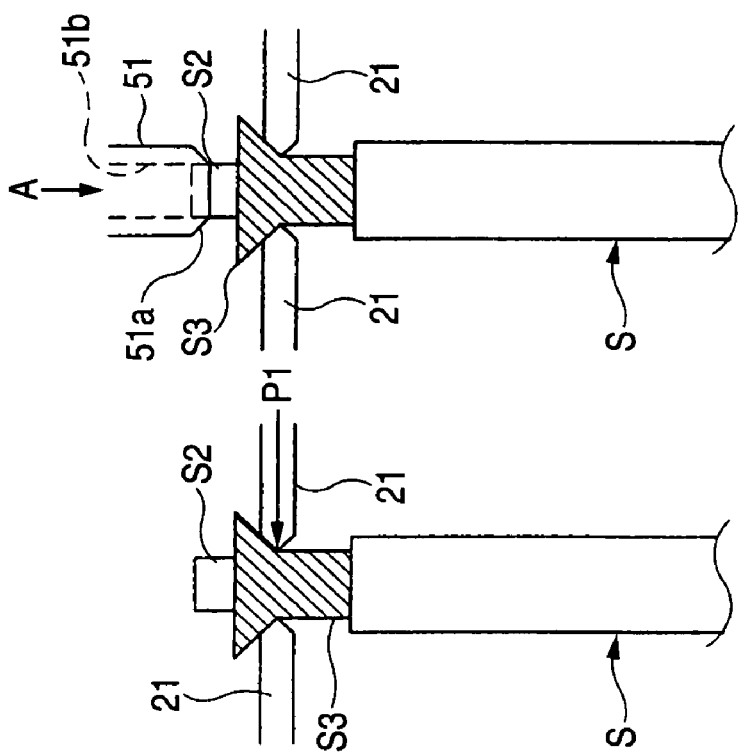
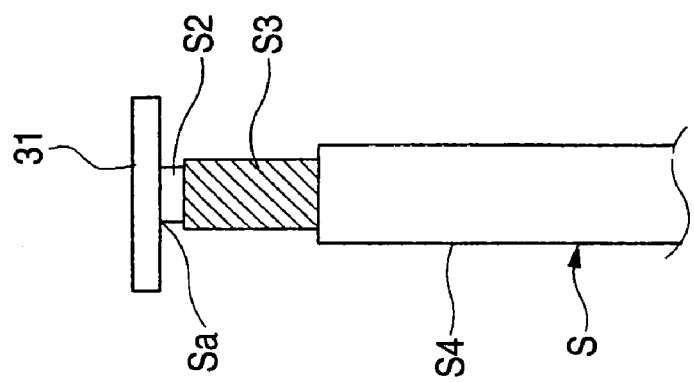

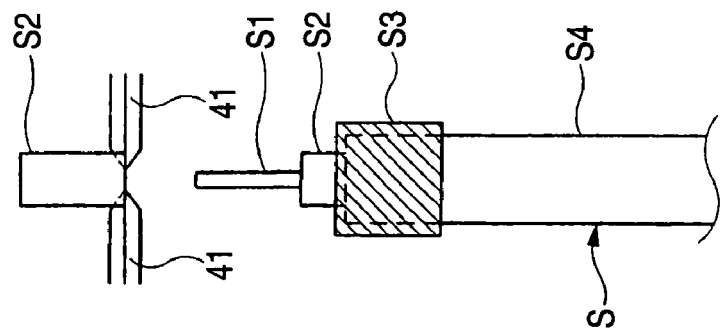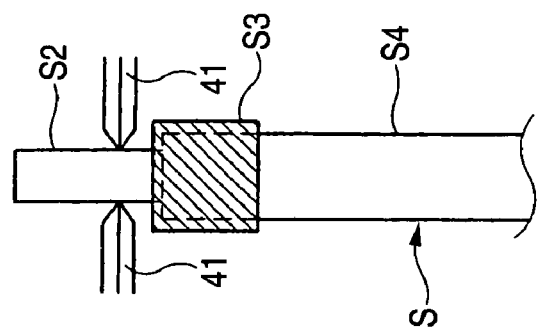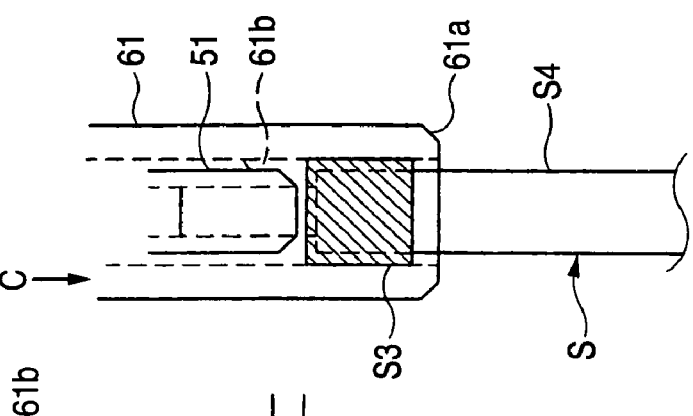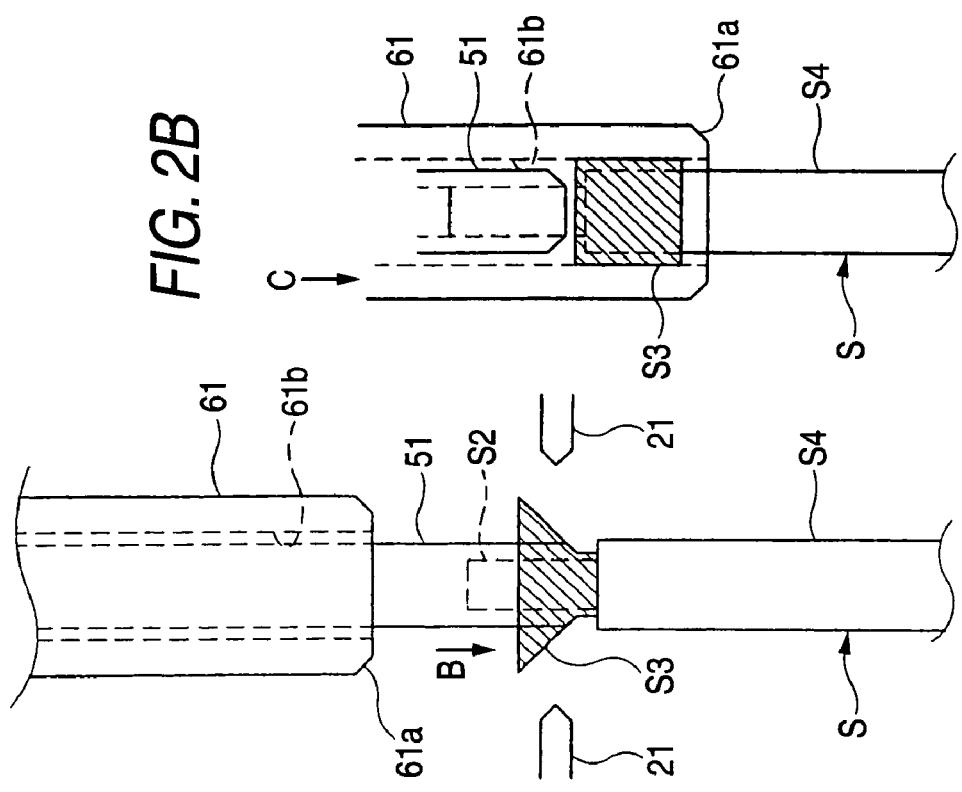

METHOD OF PROCESSING END PORTIONS OF SHIELDED WIRE

BACKGROUND OF THE INVENTION

This invention relates to a method of processing an end portion of a shielded wire and an end portion processing apparatus.

In the case of applying an end processing to a shielded wire (or cable) including, for example, a core wire (center conductor), an inner sheath (inner layer) covering the conductor, a braid (shielding member) covering the inner sheath, and an outer sheath (outer covering) covering the braid, first, the outer sheath is stripped off or removed over a predetermined length at an end portion of the wire to expose the braid, and then the exposed braid is turned or folded back on the outer sheath, and then the exposed inner sheath is stripped off or removed to expose the conductor. Thus, these steps are carried out in this order.

A problem with this end processing is the processing of the braid. This braid, after expanded into a generally trumpet bell-shape, need to be turned or folded back on the outer sheath, and this processing is difficult.

There has been proposed a braid processing method in a related automated apparatus, in which a pair of expansion claws (punches) are driven to strike against an outer surface of the braid radially thereof, thereby expanding an end portion of the exposed braid, and then the pair of expansion claws are driven to strike against a proximal end portion of the exposed braid, thereby expanding the exposed braid into a larger size. Thereafter, a pipe is inserted to be fitted on an outer periphery of an inner sheath disposed on the inside of the expanded braid. In this condition, a braid-reversing member of a half-split shape is slid on the pipe toward the shielded wire to fold back the expanded braid on the outer sheath (see, for example, JP-A-2000-102133).

In the above related method, the expansion claws are shifted in the axial direction such that the striking of the expansion claws against the braid is carried out twice, and by doing so, the braid is expanded into a larger size before the folding-back step. However, in the second striking operation of the expansion claws, the expansion claws are driven to strike against the braid, with the end portion of the shielded wire not held by any means. Therefore, the expansion claws often struck against the braid in a bent condition of the shielded wire, and in some cases the braid was not expanded uniformly. When the braid is not expanded uniformly, the folding-back step at a later stage can not be carried out in a stable manner, and as a result the yield is lowered.

SUMMARY OF THE INVENTION

This invention has been made in view of the above circumstances, and an object of the invention is to provide a method of and an apparatus for processing an end portion of a shielded wire, in which the expansion of a braid can be effected in a stable manner, thereby enhancing the yield.

The above object has been achieved by a shielded wire end processing method having features recited in the following Paragraphs (1) to (5).

(1) A method of processing an end portion of a shielded wire, comprising:

positioning the end portion of the shielded wire in which part of an outer sheath has been removed such that an exposed braid disposed between an inner sheath and the outer sheath extends from a distal end of the outer sheath;

expanding an end portion of the exposed braid after the positioning process; and folding back the braid with the expanded end portion on the outer sheath after the expanding process, wherein the expanding process includes:

strike against a first position of an outer surface of the braid radially thereof by a pair of claw portions so that the end portion of the braid is expanded into a first size (first-stage expanding process);

fitting a first pipe portion onto an outer periphery of the inner sheath from a distal end thereof in a state that the end portion of the shielded wire is held by the claw portions (pipe fitting process); and striking against a second position of the outer surface of the braid which is closer to a proximal end of the exposed braid than the first position by the clamp portions so that the end portion of the braid is further expanded into a second size larger than the first size in a state that the distal end portion of the shielded wire is held by the first pipe portion (second-stage expanding process).

(2) The method of the above Paragraph (1) further includes:

sliding the first pipe portion toward the proximal end of the exposed braid so that the braid is further spread into a larger size after striking against the second position of the outer surface of the braid (third-stage expanding process).

(3) In the method of the above Paragraph (1), a second pipe portion, provided on an outer periphery of the first pipe portion in concentric relation thereto, is slid toward the shielded wire so as to fold back the expanded braid on the outer sheath in the folding-back process.

(4) The method of the above Paragraph (1), the pair of claw portions have respective V-shaped edges, each of the V-shaped edges being formed by two linear edge portions. The V-shaped edges are opposed to each other such that the shielded wire is to be disposed therebetween for striking against the braid of the shielded wire by the four linear edge portions of the pair of claw portions.

In the end processing method of the above Paragraph (1), at the second-stage expanding process, the expansion claws are caused to strike against the braid, with the distal end portion of the shielded wire held by the first pipe, and therefore the braid can be expanded or spread into a stable uniform shape, and errors in expansion of the braid can be reduced. And besides, in the end processing method of the above Paragraph (1), since the braid can be expanded into the stable uniform shape, the subsequent folding-back process can be carried out properly. As a result, the defective processing is reduced, and the yield can be enhanced, thus contributing to the conservation of resources.

In the end processing method of the above Paragraph (2), after the second-stage expanding process, there is carried out the third-stage expanding process in which the first pipe is slid toward the proximal end of the braid, thereby further expanding the braid into a larger size by the distal end portion of the first pipe. Thus, the braid can be expanded into a larger diameter, and therefore the subsequent folding-back process can be carried out properly.

In the end processing method of the above Paragraph (3), the folding-back process is carried out by sliding the second pipe mounted on the outer periphery of the first pipe in concentric relation thereto. Therefore, as compared with the folding-back process employing the related braid-reversing member of a half-split shape, the braid can be more neatly folded back on the outer sheath while reducing damage to the shielded wire. Namely, even when two halves of the half-split braid-reversing member are joined together to form a round hole, corner portions are inevitably formed on an inner surface of this round hole because of its structure, and such corner portions can cause damage to the shielded wire. On the other hand, the cylindrical second pipe has no line of juncture, and hence has no corner portion at all, and therefore can be smoothly slid. Therefore, there is no risk of damaging the shielded wire by a corner portion. And besides, in the case of using the cylindrical second pipe as the folding-back member, there are further advantages that the working of a material for obtaining this pipe is easy and that the mounting adjustment is easy.

In the end processing method of the above Paragraph (4), the pair of expansion claws have the respective V-shaped edges each defined by the two linear edge portions, and the V-shaped edges are opposed to each other such that the shielded wire is to be disposed therebetween, and the four linear edge portions of the pair of expansion claws are caused to strike against the braid. Therefore, merely by opening and closing the pair of expansion claws in a predetermined position, the same effect as obtained by applying striking forces from four directions can be applied to the braid. Therefore, it is not necessary to carry out a cumbersome operation such for example as an operation for turning or angularly moving the expansion claws so as to change the positions where the expansion claws strike against the braid in the circumferential direction of the shielded wire. Thus, the construction is simplified.

The above object has also been achieved by a shielded wire end processing apparatus having features recited in the following Paragraph (5).

(5) An end portion processing apparatus for processing an end portion of a shielded wire in which part of an outer sheath has been removed such that an exposed braid disposed between an inner sheath and the outer sheath extends from a distal end of the outer sheath, the end portion processing apparatus comprising:

a wire clamp portion which positions the end portion of the shielded wire in an open condition of the wire clamp portion, and clamps the end portion of the shielded wire;

a pair of claw portions;

a first pipe portion which is disposed in a standby position on a line of extension of the clamped end portion of the shielded wire;

a second pipe portion which is provided on an outer periphery of the first pipe portion in concentric relation thereto; and a control portion which controls the operations of the claw portions, the first pipe portion and the second pipe portion, and wherein the pair of claw portions strikes against a first position of an outer surface of the braid radially thereof so that the end portion of the braid is expanded into a first size;

the first pipe portion is fitted onto an outer periphery of the inner sheath from a distal end thereof in a state that the end portion of the shielded wire is held by the claw portions;

the pair of claw portions strikes against a second position of the outer surface of the braid which is closer to a proximal end of the exposed braid than the first position so that the end portion of the braid is further expanded into a second size larger than the first size in a state that the distal end portion of the shielded wire is held by the first pipe portion;

the first pipe portion is slid toward the proximal end of the exposed braid so that the braid is further spread into a larger size after striking against the second position of the outer surface of the braid by the claw portions; and the second pipe portion is slid toward the shielded wire so as to fold back the expanded braid on the outer sheath.

Preferably, the pair of claw portions have respective V-shaped edges, each of the V-shaped edges being formed by two linear edges. The V-shaped edges are opposed to each other such that the shielded wire is to be disposed therebetween for striking against the braid of the shielded wire by the four linear edges of the pair of claw portions.

In the end processing apparatus of the above Paragraph (5), the striking operations for the braid are effected sequentially at the two processes, and the striking position is shifted in the axial direction, and therefore the braid can be expanded into a large size. And besides, in the end processing apparatus of the above Paragraph (5), at the second-stage expanding process, the expansion claws are caused to strike against the braid, with the distal end portion of the shielded wire held by the first pipe, and therefore the braid can be expanded or spread into a stable uniform shape, and errors in expansion of the braid can be reduced. Furthermore, in the end processing apparatus of the above Paragraph (5), since the braid can be expanded into the stable uniform shape, the subsequent folding-back process can be carried out properly. As a result, the defective processing is reduced, and the yield can be enhanced, thus contributing to the conservation of resources. Furthermore, in the end processing apparatus of the above Paragraph (5), after the second-stage expanding process, the third-stage expanding process is carried out by sliding the first pipe toward the proximal end of the braid, and therefore the braid can be expanded into a larger size, and therefore the folding-back process can be carried out properly. Furthermore, in the end processing apparatus of the above Paragraph (5), the braid folding-back process is carried out by the use of the second pipe mounted on the outer periphery of the first pipe in concentric relation thereto. Therefore, as compared with the folding-back process employing the related braid-reversing member of a half-split shape, the braid can be more neatly folded back on the outer sheath while reducing damage to the shielded wire. Furthermore, in the end processing apparatus of the above Paragraph (5), the cylindrical pipe is used as the reversing member, and therefore the working of a material for obtaining the part can be carried out easily, and the mounting adjustment can be easily effected.

In the present invention, the expansion of the braid can be carried out in a stable manner, so that the yield can be enhanced.

The present invention has been briefly described above. Details of the invention will become more manifest upon reading the following Section "Best Mode for Carrying Out the Invention" with reference to the accompanying drawings.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 1A to 1D are views showing the steps of a shielded wire end processing method of the present invention;

FIGS. 2A to 2D are views showing the steps subsequent to the steps of FIGS. 1A to 1D;

DETAILED DESCRIPTION OF THE PREFERRED EMBODIMENTS

A preferred embodiment of the present invention will now be described with reference to the drawings.

FIGS. 1A to 1D and FIGS. 2A to 2D are views showing the steps of a shielded wire end processing method of the invention. The end processing method of this embodiment is directed to a method of processing an end portion of a shielded wire (or cable) S comprising a core wire (center conductor) S1, an inner sheath (inner layer) S2 covering the conductor S1, a braid (shielding member) S3 covering the inner sheath S2, and an outer sheath (outer covering) S4 covering the braid S3. The wire end-processing process broadly comprises the positioning step (FIG. 1A) of positioning the end portion of the shielded wire S in a processing position, the expanding step (FIGS. 1B to 2A) of expanding an end portion of the exposed braid S3, the folding-back step (FIG. 2B) of folding back the braid (having the expanded end portion) on the outer sheath S4, and the stripping step (FIGS. 2C and 2D) of removing the inner sheath S2.

Before describing the processing method, the shielded wire end processing apparatus of this embodiment will be described.

Figure 3:
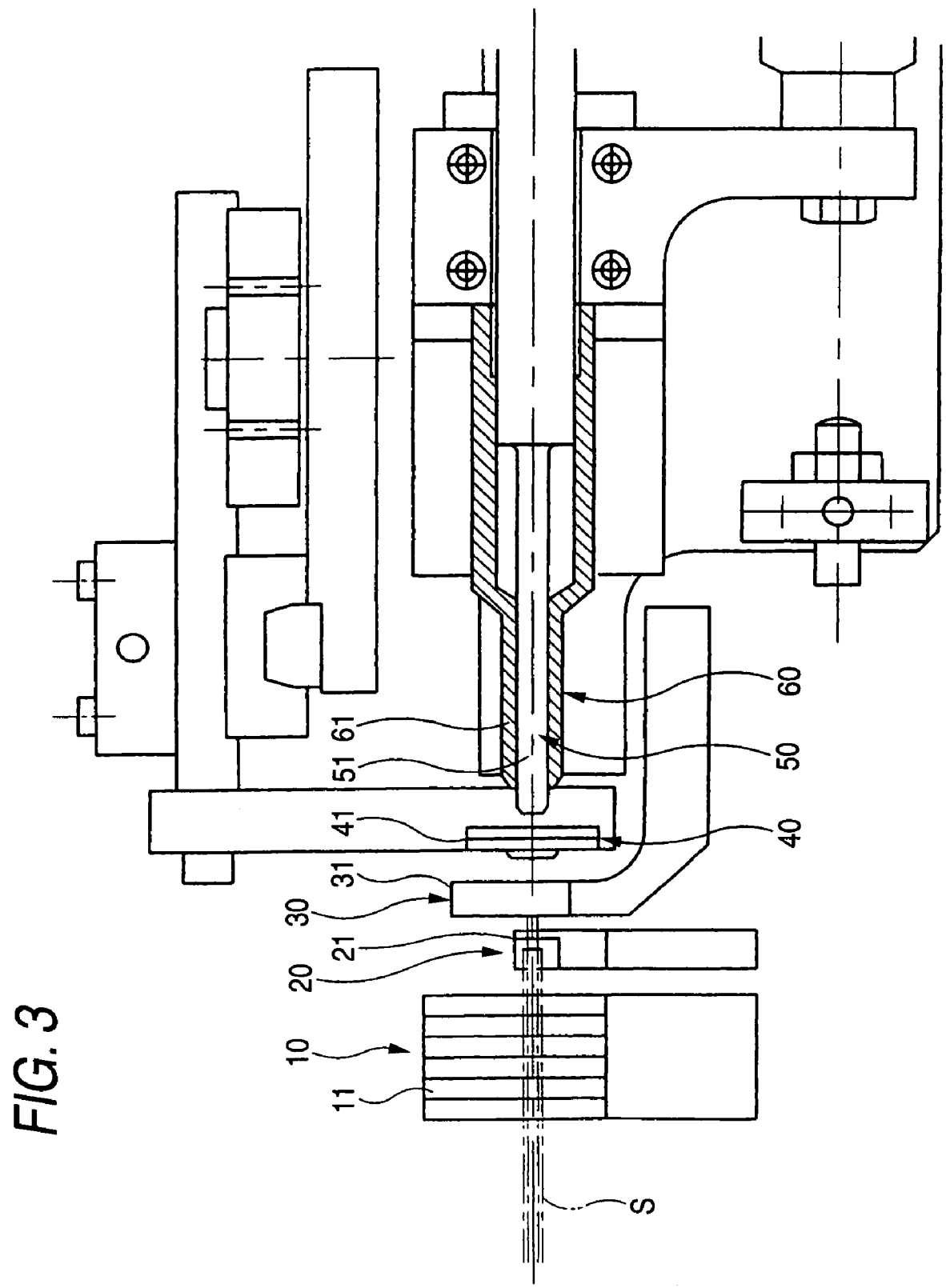
FIG. 3 is a partly cross-sectional, side-elevational view showing the broad construction of an important portion of a preferred embodiment of an end processing apparatus of the invention.
Figure 4:
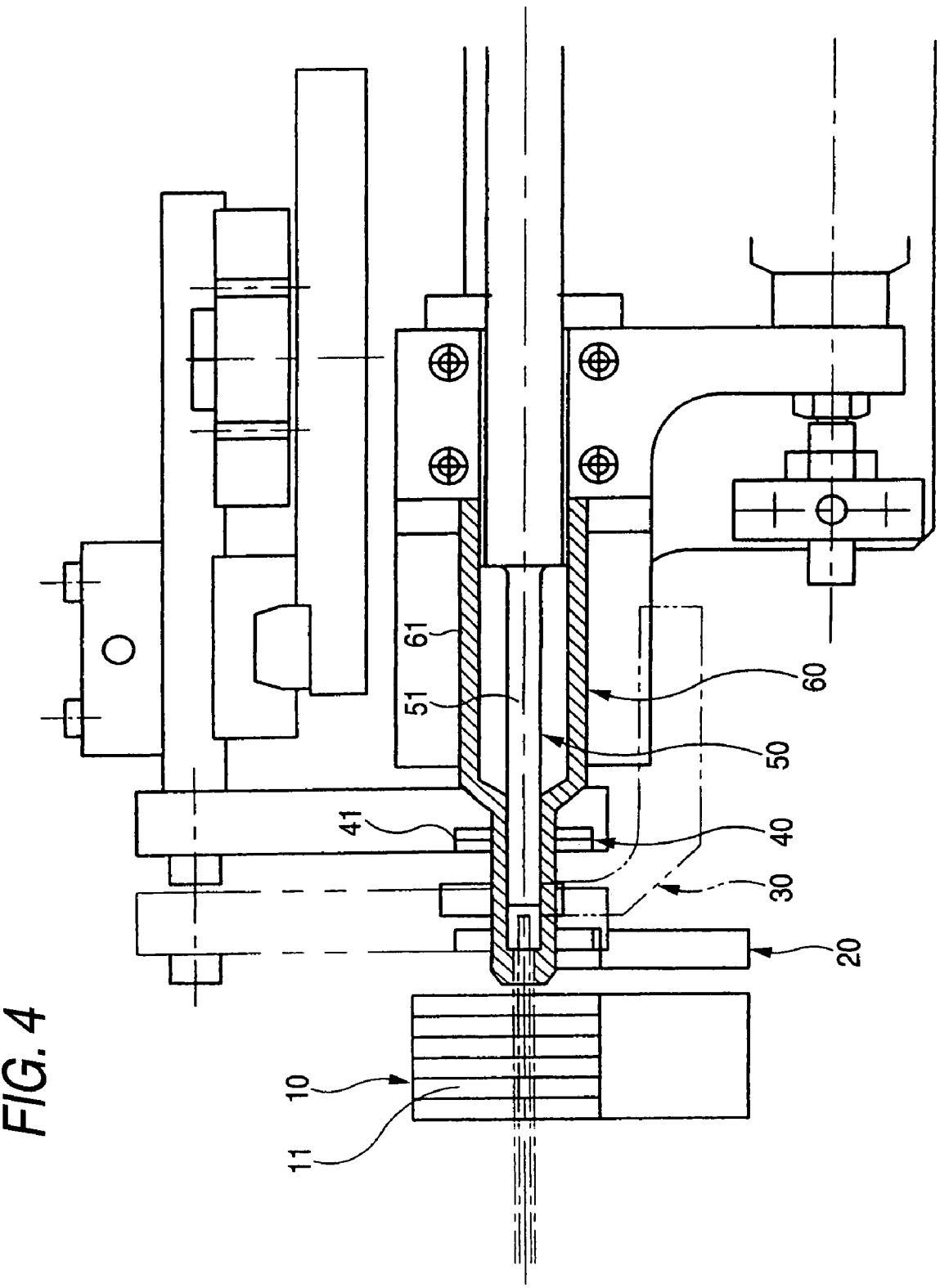
FIG. 4 is a view similar to FIG. 3, but showing an operated condition of the apparatus of FIG. 3.
Figure 5A:
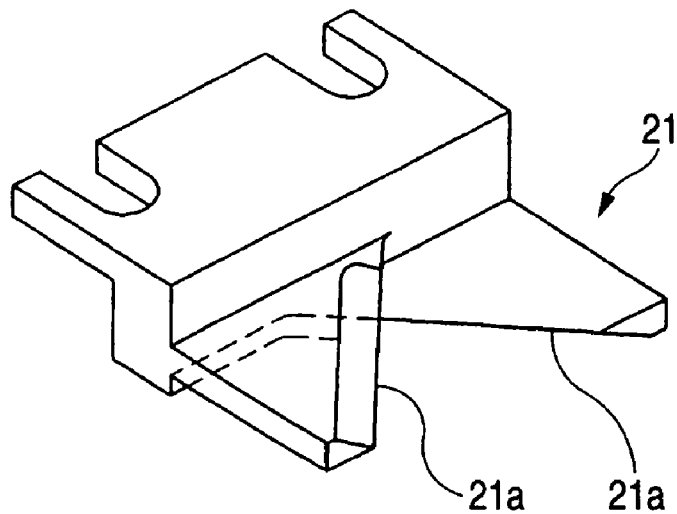
FIG. 5A is a perspective view showing the construction of a expansion claw used in the end processing apparatus.
Figure 5B:
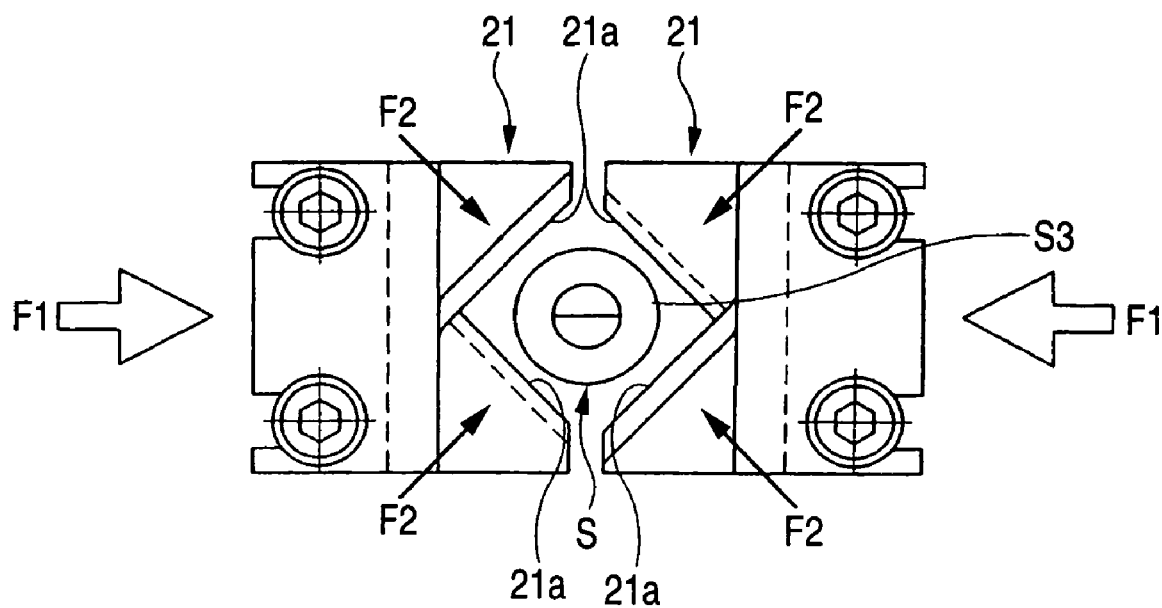
FIG. 5B is a front-elevational view showing a pair of expansion claws in an assembled condition.

FIG. 3 is a partly cross-sectional, side-elevational view showing the broad construction of an important portion of the end processing apparatus, FIG. 4 is a view similar to FIG. 3, but showing an operated condition of the apparatus of FIG. 3, and FIGS. 5A and 5B are view showing the construction of expansion claws.

This end processing apparatus comprises a clamp unit 10 having a pair of wire clamps 11 which allow the end portion of the shielded wire S to be positioned in their open condition, and clamp the wire end portion, an expansion unit 20 having a pair of openable and closable expansion claws 21 which are driven to strike against the exposed braid 3 (see FIGS. 1A to 1D) radially thereof at the clamped end portion of the shielded wire S to expand the end portion of the braid S3, a positioning unit 30 having a positioning plate 31 which positions the end portion of the shielded wire S when a distal end surface Sa (see FIG. 1A) of the shielded wire S is brought into abutting engagement with this positioning plate 31, a stripper unit 40 having stripper blades 41 for removing the inner sheath S2 (see FIGS. 1A to 1D), a first pipe unit 50 which is disposed in a standby position on a line of extension of the clamped end portion of the shielded wire S, and slides a first pipe 51 to fit the same onto the outer periphery of the inner sheath S2 at the stage of expansion of the end portion of the braid S3, a second pipe unit 60 which slides a second pipe 61 (serving as a reversing member), mounted on the outer periphery of the first pipe 51 in concentric relation thereto, toward the shielded wire S to cause this second pipe 61 to turn or fold back the expanded braid S3 on the outer sheath S4 (see FIGS. 2A to 2D), and a control device (not shown) for controlling the operations of the clamp unit 10, the expansion unit 20, the positioning unit 30, the stripper unit 40, the first pipe unit 50 and the second pipe unit 60.

The first pipe 51 has an inner hole (or bore) 51b having a diameter slightly larger than an outer diameter of the inner sheath S2, and also has a chamfered tapering surface 51a formed at a distal end thereof. The second pipe 61 has an inner hole (or bore) 61b having a diameter slightly larger than an outer diameter of the folded-back portion of the braid S3, and has a chamfered tapering surface 61a formed at a distal end thereof.

As shown in FIGS. 5A and 5B, the pair of expansion claws 21 have respective V-shaped edges each defined by two linear edge portions 21a, and the two V-shaped edges are opposed to each other such that the shielded wire S is to be disposed therebetween. The four linear edge portions 21a are caused to strike against the braid S3 of the shielded wire S. Forces F1 exerted in a right-left direction are applied to the right and left expansion claws 21, respectively, and each linear edge portion 21a is inclined at an angle of 45 degrees with respect to the direction of application of the force F1, and therefore the four linear edge portions 21a strike against the braid S3 with respective forces F2 respectively from four directions. Therefore, merely by opening and closing the pair of expansion claws 21 (that is, by moving the two expansion claws 21 away from and toward each other) in a predetermined position, the same effect as obtained by applying striking forces from four directions can be applied to the braid S3. Therefore, it is not necessary to carry out a cumbersome operation such for example as an operation for turning or angularly moving the expansion claws so as to change the positions (where the expansion claws strike against the braid) in the circumferential direction of the shielded wire. Thus, the construction is simplified. Instead of using the pair of expansion claws 21 shown in FIGS. 5A and 5B, a pair of expansion claws each having a curved edge can be used for striking engagement with the braid S3 of the shielded wire S. In this case, also, merely by opening and closing the pair of expansion claws in the predetermined position, the same effect as obtained by applying striking forces radially inwardly of the shielded wire S can be applied to the braid S3. Particularly, the curved edges of the pair of expansion claws are so shaped as to conform to the contour of the outer periphery of the shielded wire S, the striking forces can be applied to the braid S3 generally uniformly over the entire periphery thereof.

The end processing method which is carried out in accordance with instructions from the control device will be described with reference to FIGS. 1A to 1D and FIGS. 2A to 2D.

For effecting the end processing, first, in the positioning step shown in FIG. 1A, there is prepared the shielded wire S in which part of the outer sheath S4 has been removed such that the exposed braid S3 disposed between the inner sheath S2 and the outer sheath S4 extends from a distal end of the outer sheath S4. Then, the distal end surface Sa of the shielded wire S is brought into abutting engagement with the positioning plate 31, thereby positioning the end portion of the shielded wire S. In this condition, the shielded wire S is clamped by the wire clamps 11 (see FIG. 3). After this clamping operation is finished, the positioning member 31 is retracted to a place where it will not interfere with the subsequent operations.

Then, the processing shifts to the expanding step shown in FIGS. 1B to 2A. In this expanding step, first, the pair of openable and closable expansion claws 21 are driven to strike against the outer surface of the braid 3 radially thereof, thereby expanding the end portion of the braid S3 as shown in FIG. 1B (The first-stage expanding process).

Then, as shown in FIG. 1C, the first pipe 51 is inserted to be fitted on the outer periphery of the inner sheath S2 from the distal end thereof as indicated by arrow A, with the end portion of the shielded wire S kept held by the closed expansion claws 21 (The pipe fitting process). At this stage, the distal end portion of the shielded wire S (at which the inner sheath S2 remains) is inserted into the inner hole 51b of the first pipe 51.

Then, as shown in FIG. 1D, the expansion claws 21 are once opened, with the distal end portion of the shielded wire S kept held by the first pipe 51, and then the expansion claws 21 are again driven to strike against the braid S3 at a position P2 which is closer to the proximal end of the exposed braid than a position P1 (where the expansion claws 21 have struck against the braid S3 at the first-stage expanding process) is, thereby further expanding the end portion of the braid S3 (The second-stage expanding process). After this expanding operation is finished, the expansion claws 21 are opened.

Then, as shown in FIG. 2A, the first pipe 51 is slid toward the proximal end of the braid S3 (that is, in a direction of arrow B), thereby further expanding the braid S3 into a larger size by the tapering surface 51a of the first pipe 51 formed at the distal end thereof (The third-stage expanding process).

Here, the expanding step is finished, and then the folding-back step is carried out. In this folding-back step, the second pipe 61, mounted on the outer periphery of the first pipe 51 in concentric relation thereto, is slid toward the shielded wire S (that is, in a direction of arrow C), thereby folding back the expanded braid S3 on the outer sheath S4 as shown in FIG. 2B.

After the braid S3 is thus folded back on the outer sheath S4, the first and second pipes 51 and 61 are retracted, and then the stripper blades 41 are brought into piercing engagement with the inner sheath S2 to form cuts in this inner sheath S2 as shown in FIG. 2C, and in this condition the stripper blades are moved away from the shielded wire, thereby withdrawing a cut piece of the inner sheath S2 as shown in FIG. 2D. Thus, the end processing is finished.

At the second-stage expanding process of the above process, the expansion claws 21 are caused to strike against with the braid S3, with the distal end portion of the shielded wire S held by the first pipe 51, and therefore the braid can be expanded or spread into a stable uniform shape, and errors in expansion of the braid S3 can be reduced. And besides, since the braid S3 can be expanded into the stable uniform shape, the subsequent folding-back step can be carried out properly. As a result, the defective processing is reduced, and the yield can be enhanced, thus contributing to the conservation of resources.

Furthermore, after the second-stage expanding process, there is carried out the third-stage expanding step in which the first pipe 51 is slid toward the proximal end of the exposed braid S3, thereby further expanding the braid S3 into a larger size by the distal end portion of the first pipe 51. Thus, the braid S3 can be expanded into a larger diameter, and therefore the subsequent folding-back step can be carried out properly.

Furthermore, the step of folding back the braid S3 is carried out by sliding the second pipe 61 mounted on the outer periphery of the first pipe 51 in concentric relation thereto. Therefore, as compared with the folding-back step employing the related braid-reversing member of a half-split shape, the braid S3 can be more neatly folded back on the outer sheath S4 while reducing damage to the shielded wire S. Namely, even when two halves of the half-split braid-reversing member are joined together to form a round hole, corner portions are inevitably formed on an inner surface of this round hole because of its structure, and such corner portions can cause damage to the shielded wire S. On the other hand, the cylindrical second pipe 61 has no line of juncture, and hence has no corner portion at all, and therefore can be smoothly slid. Therefore, there is no risk of damaging the shielded wire S by a corner portion. And besides, in the case of using the cylindrical second pipe 61 as the folding-back member (braid-reversing member), there are further advantages that the working of a material for obtaining this pipe is easy and that the mounting adjustment is easy.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The present application is based on Japan Patent Application No. 2006-017908 filed on Jan. 26, 2006, the contents of which are incorporated herein for reference.

What is claimed is:

1. A method of processing an end portion of a shielded wire, comprising:
    positioning the end portion of the shielded wire in which part of an outer sheath has been removed such that an exposed braid disposed between an inner sheath and the outer sheath extends from a distal end of the outer sheath;
    expanding an end portion of the exposed braid after the positioning process; and
    folding back the braid with the expanded end portion on the outer sheath after the expanding process,
    wherein the expanding process includes:
        strike against a first position of an outer surface of the braid radially thereof by a pair of claw portions so that the end portion of the braid is expanded into a first size;
        fitting a first pipe portion onto an outer periphery of the inner sheath from a distal end thereof in a state that the end portion of the shielded wire is held by the claw portions; and
        striking against a second position of the outer surface of the braid which is closer to a proximal end of the exposed braid than the first position by the clamp portions so that the end portion of the braid is further expanded into a second size larger than the first size in a state that the distal end portion of the shielded wire is held by the first pipe portion.

2. The method according to claim 1, wherein the expanding process
    further includes:
        sliding the first pipe portion toward the proximal end of the exposed braid so that the braid is further spread into a larger size after striking against the second position of the outer surface of the braid.

3. The method according to claim 1, wherein a second pipe portion, provided on an outer periphery of the first pipe portion in concentric relation thereto, is slid toward the shielded wire so as to fold back the expanded braid on the outer sheath in the folding-back process.

4. The method according to claim 1, wherein the pair of claw portions have respective V-shaped edges, each of the V-shaped edges being formed by two linear edge portions; and
    wherein the V-shaped edges are opposed to each other such that the shielded wire is to be disposed therebetween for striking against the braid of the shielded wire by the four linear edge portions of the pair of claw portions.

* * * * *